(12) United States Patent
Etchason

(10) Patent No.: US 9,562,462 B2
(45) Date of Patent: Feb. 7, 2017

(54) SYSTEM AND METHOD FOR POWERTRAIN WASTE HEAT RECOVERY

(71) Applicant: Allison Transmission, Inc., Indianapolis, IN (US)

(72) Inventor: Edmond M. Etchason, New Palestine, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 29 days.

(21) Appl. No.: 14/536,795

(22) Filed: Nov. 10, 2014

(65) Prior Publication Data
US 2016/0131009 A1 May 12, 2016

(51) Int. Cl.
*F01K 23/10* (2006.01)
*F01N 5/02* (2006.01)
*F01K 3/10* (2006.01)
*F01K 15/02* (2006.01)
*F01K 23/06* (2006.01)
*F16H 57/04* (2010.01)
*B60T 5/00* (2006.01)
*B60T 10/02* (2006.01)
*F16D 57/04* (2006.01)
*F22B 1/00* (2006.01)
(Continued)

(52) U.S. Cl.
CPC . *F01N 5/02* (2013.01); *B60T 5/00* (2013.01); *B60T 10/02* (2013.01); *F01K 3/10* (2013.01); *F01K 15/02* (2013.01); *F01K 23/065* (2013.01); *F16D 57/04* (2013.01); *F16H 57/0413* (2013.01); *F22B 1/00* (2013.01); *F16D 2065/782* (2013.01); *F16D 2066/001* (2013.01)

(58) Field of Classification Search
CPC ............ F01N 5/02; F22B 1/00; F01K 23/065; F01K 25/08; F02G 5/04
USPC .......................... 60/618, 616, 670, 672, 701
See application file for complete search history.

(56) References Cited

U.S. PATENT DOCUMENTS 4,264,826 A * 4/1981 Ullmann ............... F01K 17/005
122/26
4,930,484 A 6/1990 Binkley et al.
(Continued)

FOREIGN PATENT DOCUMENTS

DE 102008029340 12/2009
GB 2 063 370 A 6/1961
(Continued)

*Primary Examiner* — Nicholas J Weiss
*Assistant Examiner* — Jason T Newton
(74) *Attorney, Agent, or Firm* — Woodard Emhardt Moriarty McNett and Henry LLP

(57) ABSTRACT

A powertrain waste heat recovery system includes a first powertrain component and a second powertrain component. The powertrain waste heat recovery system also includes a heat recovery circuit circulating a heat recovery fluid through a heat recovery heat exchanger. The heat recovery heat exchanger transfers heat from the first powertrain component to the heat recovery fluid during a powertrain propulsion mode and transfers heat from the second powertrain component to the heat recovery fluid during a powertrain retarding mode. The powertrain waste heat recovery system also includes a conversion device for converting thermal energy from the heat recovery fluid to an energy form other than thermal energy.

23 Claims, 4 Drawing Sheets

(51) Int. Cl.
*F16D 66/00* (2006.01)
*F16D 65/78* (2006.01)

(56) References Cited

U.S. PATENT DOCUMENTS

| | | | | |
|---|---|---|---|---|
| 5,121,607 A * | 6/1992 | George, Jr. | ............. | F01C 20/04 |
| | | | | 60/618 |
| 5,241,817 A | 9/1993 | George, Jr. | | |
| 5,279,262 A * | 1/1994 | Muehleck | ............... | F16D 57/00 |
| | | | | 122/26 |
| 6,773,368 B1 | 8/2004 | Williames | | |
| 6,981,850 B1 | 1/2006 | Maltbie et al. | | |
| 7,401,578 B2 * | 7/2008 | Otterstrom | ............. | F02B 47/02 |
| | | | | 123/3 |
| 7,866,157 B2 | 1/2011 | Ernst et al. | | |
| 8,407,998 B2 | 4/2013 | Ernst et al. | | |
| 8,635,871 B2 | 1/2014 | Ernst et al. | | |
| 8,707,914 B2 | 4/2014 | Barnes | | |
| 2006/0068970 A1 * | 3/2006 | Rose | ........................ | B60K 6/12 |
| | | | | 477/34 |
| 2009/0133646 A1 * | 5/2009 | Wankhede | ............... | B60H 1/14 |
| | | | | 123/41.31 |
| 2009/0235661 A1 | 9/2009 | Janssen | | |
| 2011/0023483 A1 | 2/2011 | Berger et al. | | |
| 2011/0214629 A1 * | 9/2011 | Benoit | ...................... | F01P 1/06 |
| | | | | 123/41.09 |
| 2011/0220729 A1 * | 9/2011 | Bucknell | .................. | F01N 5/02 |
| | | | | 237/12.3 R |
| 2012/0001436 A1 * | 1/2012 | Sami | ......................... | F01K 7/22 |
| | | | | 290/55 |
| 2012/0198839 A1 | 8/2012 | Nelson et al. | | |
| 2012/0324891 A1 * | 12/2012 | Raab | .......................... | F01K 3/10 |
| | | | | 60/668 |
| 2013/0219872 A1 | 8/2013 | Gibble et al. | | |
| 2013/0333380 A1 * | 12/2013 | Kardos | ............... | B60W 30/188 |
| | | | | 60/605.1 |
| 2014/0208738 A1 * | 7/2014 | Park | .......................... | F02G 5/02 |
| | | | | 60/599 |

FOREIGN PATENT DOCUMENTS

| | | | | |
|---|---|---|---|---|
| JP | 2010077901 A * | 4/2010 | ............. | F02G 5/04 |
| JP | 2012002118 | 1/2012 | | |
| WO | WO 99/22120 A1 | 5/1999 | | |

* cited by examiner

SYSTEM AND METHOD FOR POWERTRAIN WASTE HEAT RECOVERY

TECHNICAL FIELD

The present disclosure relates generally to the recovery of waste heat from powertrain components.

BACKGROUND

Vehicles, or, more particularly, the components powering and driving vehicles, generate a significant amount of energy in the form of heat that is wasted. For example, an internal combustion engine, or other similar power source, produces a lot of heat in the form of exhaust that is expelled from the vehicle and into the environment. Additionally, a vehicle cooling system typically collects heat from the engine components, such as the engine block, and transfers the collected heat into the ambient air using a heat exchanger positioned onboard the vehicle.

Some engine manufacturers have recognized the generation and loss of this waste heat, and have begun developing strategies to recover waste heat from the engine. For example, U.S. Pat. No. 7,866,157 to Ernst et al. discloses a waste heat recovery system that uses one or more loops to capture heat from the exhaust gas recirculation system and the exhaust stream with working fluid circulating through the loops using heat exchangers. The waste heat recovery system uses a turbine and generator to convert the heat energy into electrical energy.

There remains a continuing need to produce powered vehicles that operate with less waste, are more fuel efficient, and that have reduced emissions. The present disclosure is responsive to such an endeavor and is directed to one or more of the problems or issues set forth above.

SUMMARY OF THE DISCLOSURE

In one aspect, a powertrain waste heat recovery system includes a first powertrain component and a second powertrain component. The powertrain waste heat recovery system also includes a heat recovery circuit circulating a heat recovery fluid through a heat recovery heat exchanger. The heat recovery heat exchanger transfers heat from the first powertrain component to the heat recovery fluid during a powertrain propulsion mode and transfers heat from the second powertrain component to the heat recovery fluid during a powertrain retarding mode. Optionally, the powertrain waste heat recovery system also includes a conversion device for converting thermal energy from the heat recovery fluid to an energy form other than thermal energy.

In another aspect, a method of recovering waste heat using a powertrain waste heat recovery system includes a step of circulating a heat recovery fluid along a heat recovery circuit and through a heat recovery heat exchanger. During the circulating step, heat is transferred from a first powertrain component to the heat recovery fluid using the heat recovery heat exchanger during a powertrain propulsion mode. The method also includes steps of transferring heat, during the circulating step, from a second powertrain component to the heat recovery fluid using the heat recovery heat exchanger during a powertrain retarding mode, and optionally converting thermal energy, after the first transferring step or the second transferring step, from the heat recovery fluid to an energy form other than thermal energy using a conversion device.

In yet another aspect, a powertrain waste heat recovery system includes a first power train component, a second powertrain component, and a heat recovery circuit circulating a heat recovery fluid through a heat recovery heat exchanger. The heat recovery heat exchanger transfers heat from the first powertrain component to the heat recovery fluid during a powertrain propulsion mode and transfers heat from the second powertrain component to the heat recovery fluid during a powertrain retarding mode. The powertrain waste heat recovery system also includes one of a thermal energy conversion device and a thermal energy storage device receiving thermal energy from the heat recovery fluid.

DETAILED DESCRIPTION

Figure 1:
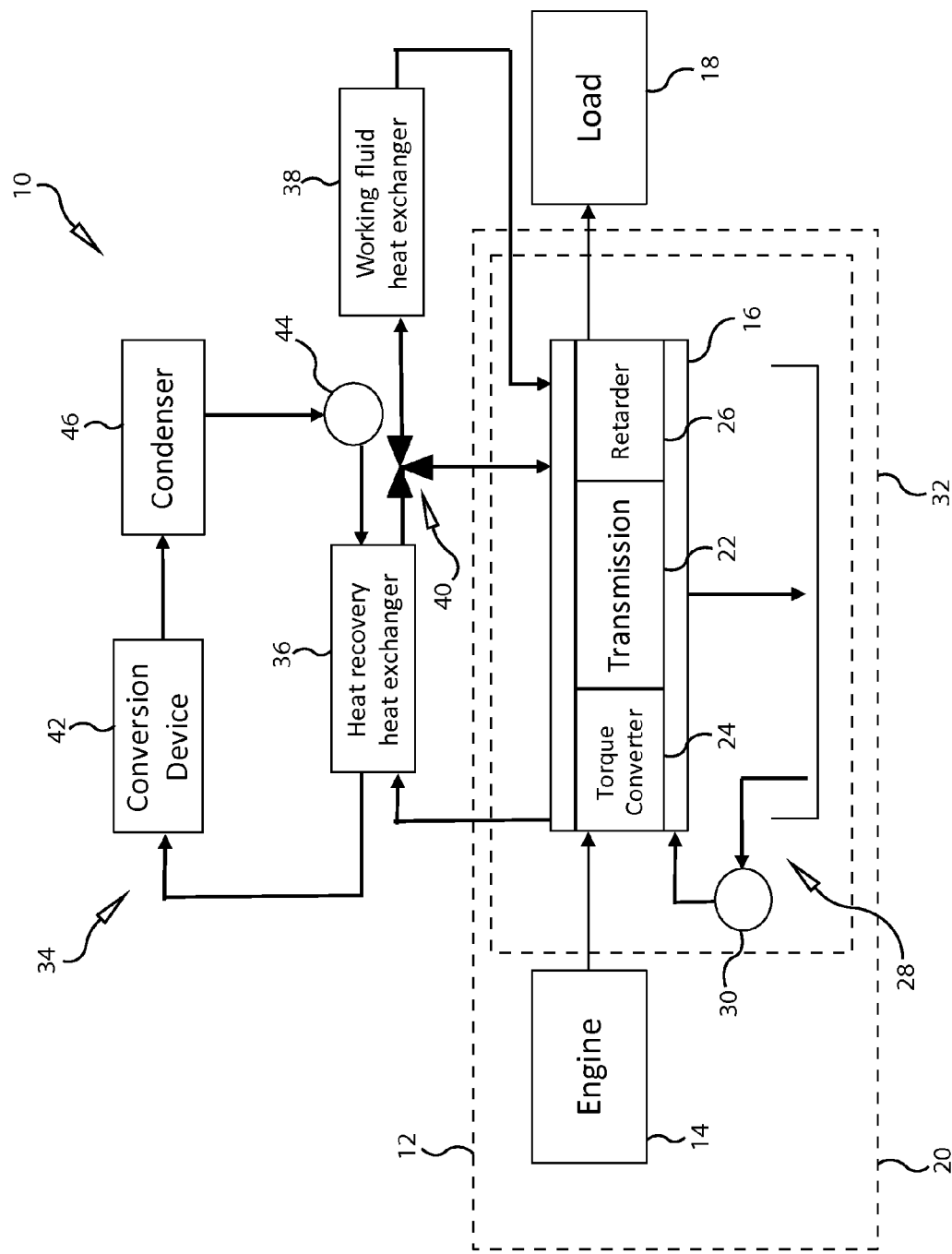
FIG. 1 is a schematic block diagram of portions of a powertrain waste heat recovery system, according to the present disclosure.

An exemplary embodiment of a powertrain waste heat recovery system 10 is shown generally in FIG. 1. As depicted in the illustrated embodiment, the powertrain waste heat recovery system 10 includes a powertrain 12 having an engine 14, or other drive mechanism or power source, providing power to a transmission system 16. The transmission system 16 provides controlled application of the engine power to a load 18 in a known manner. According to some implementations, such as a powered vehicle application, the load 18 may include drive wheels for providing propulsion for a vehicle, or machine. The transmission system 16, and all or portions of the load 18, may also be referred to as a drivetrain 20. To be clear, the powertrain 12 includes the engine 14, while the drivetrain 20 does not include the engine 14.

The transmission system 16 includes a transmission component 22, which may be a set of gears, or gear system, used to modify the power transmitted from the engine 14 to the load 18. That is, the transmission component 22 provides the speed and torque conversions needed for desired operation of the powertrain 12. Although the transmission system 16 may include a number and variety of additional components, and may have various configurations, as is known to those skilled in the art, a couple of specific components are illustrated and described herein.

A first additional powertrain component is shown at 24 and may include a torque converter. The torque converter, which may also be referenced herein using reference numeral 24, may be of conventional design, using a working fluid to transfer the rotating power of the engine 14 to the transmission component 22, and may include a pump, turbine, and stator. That is, the pump circulates fluid through the turbine, which is coupled to an input shaft of the transmission component 22. The fluid then flows to the stator where it is redirected back to the pump. The torque converter 24 may also include a lock-up clutch, also of conventional design, for selectively coupling the crankshaft of the engine 14 with the input shaft of the transmission component 22 such that both rotate at the same rate.

A second additional powertrain component is shown at 26 and may include a hydraulic retarder. The hydraulic retarder, also referenced herein using reference numeral 26, may be of conventional design and may provide secondary braking via the transmission system 16. Although a hydraulic retarder 26 is described, it should be appreciated that alternative retarders, such as electric or pneumatic retarders, may be substituted for hydraulic retarder 26. According to the exemplary embodiment, the hydraulic retarder 26 may include a vaned flywheel mounted on a shaft, such as an output shaft, of the transmission system 16. A working fluid may be directed into the hydraulic retarder 26, when additional braking is needed, to absorb energy through the shaft. Thus, the working fluid of the retarder 26 performs braking of the transmission 22 and load 18, resulting in heat that is generated by the braking action and absorbed by the working fluid. When hydraulic retarder braking action is not called for, the working fluid may be evacuated from the hydraulic retarder 26, thus removing the braking, or power absorption, capabilities of the hydraulic retarder 26.

A working fluid circuit 28 supplies a working fluid, such as a transmission fluid or oil, to the various components of the transmission system 16 in a known manner. Although the working fluid circuit 28 will typically be a complex system, such as an electro-hydraulic system, of pumps, conduits, valves, actuators, etc., and including various subsystems, the exemplary embodiment has been simplified for ease of explanation. According to the illustrated embodiment, a pump 30 may draw working fluid from a sump 32 and pump it to a pressure regulator, which maintains the pressure needed to apply clutches, or other friction devices, in the transmission component 22. Any amount of working fluid beyond what is needed by the pressure regulator may flow to the torque converter 24. The working fluid may be heated during torque converter operation, which is generally described above, with most of the heat generation occurring when the lock-up clutch is disengaged and the crankshaft of the engine 14 and the transmission input shaft are rotating at different rates.

From the torque converter 24, the working fluid may flow to a heat transfer device, or cooler, which is discussed in greater detail below, where the working fluid is cooled. The cooled working fluid may then flow back to the transmission system 16, where the working fluid may be used to lubricate gears and bearings of the transmission system 16 and, according to some embodiments, cooled working fluid may also fill, or refill, a reservoir (not shown) of working fluid for use by the hydraulic retarder 26. According to the exemplary embodiment, working fluid may drain off the gears and bearings, using gravity, into the sump 32, where the cycle may begin again.

The powertrain waste heat recovery system 10 of the present disclosure also includes a heat recovery circuit 34 circulating a heat recovery fluid, such as a heat recovery liquid, through a heat recovery heat exchanger 36. As should be clear, the heat recovery fluid is fluidly isolated from the working fluid. The heat recovery heat exchanger 36 may be of conventional design and may transfer heat from the transmission system 16 to the heat recovery fluid. For example, the working fluid circuit 28 may circulate working fluid through one or more of the torque converter 24, the transmission component 22, and the hydraulic retarder 26, as described above, and then through the heat recovery heat exchanger 36, where heat from the working fluid is transferred by the heat recovery heat exchanger 36 to the heat recovery fluid. In the case of an electric or pneumatic retarder, however, the heat recovery fluid, rather than the working fluid, may flow directly through the retarder.

The working fluid circuit 28 may include one or more additional known heat exchangers, such as a supplemental working fluid heat exchanger 38, for additional or alternative cooling of the working fluid. For example, as shown in FIG. 1, the supplemental working fluid heat exchanger 38 may be positioned in series with the heat recovery heat exchanger 36. A valve 40 may be incorporated into the working fluid circuit 28 and operable to selectively include or bypass the supplemental working fluid heat exchanger 38 during operation. Thus, the supplemental working fluid heat exchanger 38 may provide supplemental cooling of the working fluid. Alternatively, the working fluid circuit 28, and valve 40, may be positioned and configured such that the supplemental working fluid heat exchanger 38 is always utilized and the heat recovery heat exchanger 36 may be selectively bypassed.

The heat recovery circuit 34 may include a conversion device 42, examples of which will be provided below, for converting thermal energy from the heat recovery fluid, which was captured from the working fluid of the transmission system 16, to an energy form other than thermal energy. According to the exemplary embodiment, the heat recovery circuit 34 may include a pump 44, pumping a liquid heat recovery fluid through the heat recovery heat exchanger 36, where the heat recovery fluid receives heat from the working fluid, and then to the conversion device 42. According to some embodiments, the heat recovery fluid may be heated, and may be expanded to a gaseous form. As such, the heat recovery circuit 34 may include a condenser 46 for condensing the heat recovery fluid back to a liquid.

According to the present disclosure, the heat recovery heat exchanger 36 may transfer heat from the torque converter 24 to the heat recovery fluid during a powertrain propulsion mode and transfer heat from the hydraulic retarder 26 to the heat recovery fluid during a powertrain retarding mode. The powertrain propulsion mode, or powertrain propulsion cooling mode, may refer to an operation mode of the powertrain 12 in which working fluid from the torque converter 24 is circulated through the heat recovery heat exchanger 36. This may correspond to a vehicle mode of operation in which is it desired for the powertrain 12 to propel the vehicle. The powertrain retarding mode, or powertrain retarding cooling mode, may refer to an operation mode of the powertrain 12 in which working fluid from the hydraulic retarder 26 is circulated through the heat recovery heat exchanger 36. This may correspond to a vehicle mode of operation in which deceleration of the vehicle is desired.

Figure 2A:
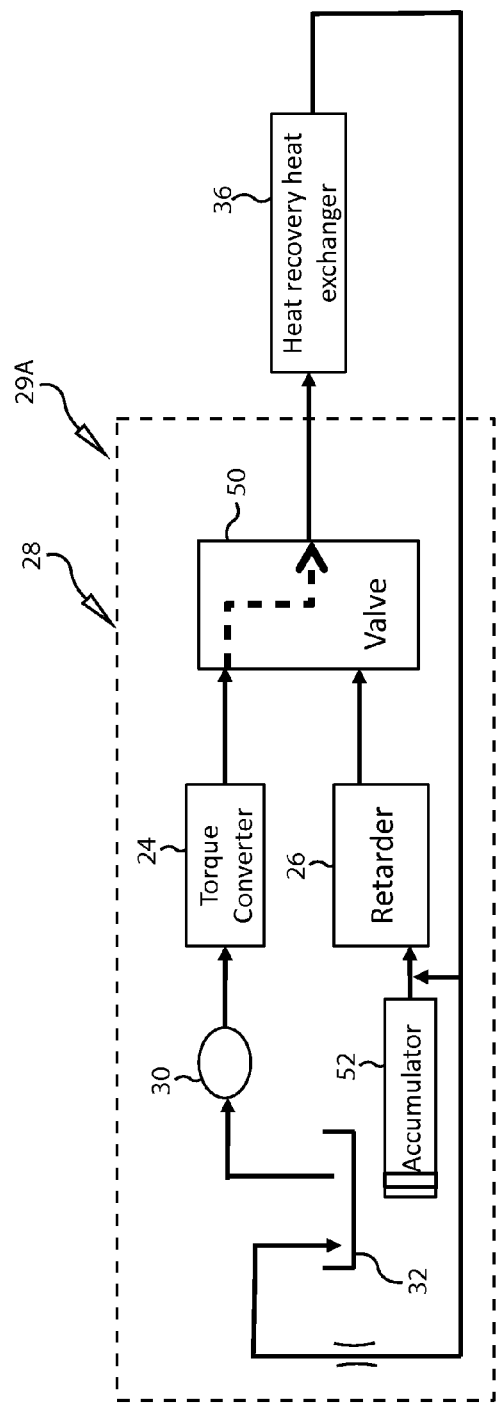
FIG. 2a is a schematic block diagram of portions of a working fluid circuit, depicting a valve for controlling flow to a heat recovery heat exchanger of the powertrain waste heat recovery system of FIG. 1, with the valve shown in a first position.

For example, as shown in FIG. 2a, the working fluid circuit 28 is depicted as operating in the powertrain propulsion mode 29a. That is, the pump 30 is pumping working fluid from the sump 32 and to the torque converter 24. The torque converter 24 operates as described above, and heated working fluid is circulated from the torque converter 24, through a working fluid circuit valve 50, and to the heat recovery heat exchanger 36. The heat recovery heat exchanger 36 transfers heat from the working fluid to the heat recovery fluid, as described above, and the cooled working fluid is ultimately transferred back to the sump 32.

Cooled working fluid may also fill an accumulator 52, used to supply working fluid to the hydraulic retarder 26.

As shown in FIG. 2a, the working fluid circuit valve 50 may have a first position in which the torque converter 24 is fluidly connected with the heat recovery heat exchanger 36. This first position of the working fluid circuit valve 50 may correspond to the powertrain propulsion mode 29a and, as such, the working fluid may be circulated from the torque converter 24 along the working fluid circuit 28, through the valve 50, and through the heat recovery heat exchanger 36 during the powertrain propulsion mode 29a. A variety of different systems and arrangements for selectively circulating working fluid from the transmission system components to the heat recovery heat exchanger 36 are contemplated.

Figure 2B:
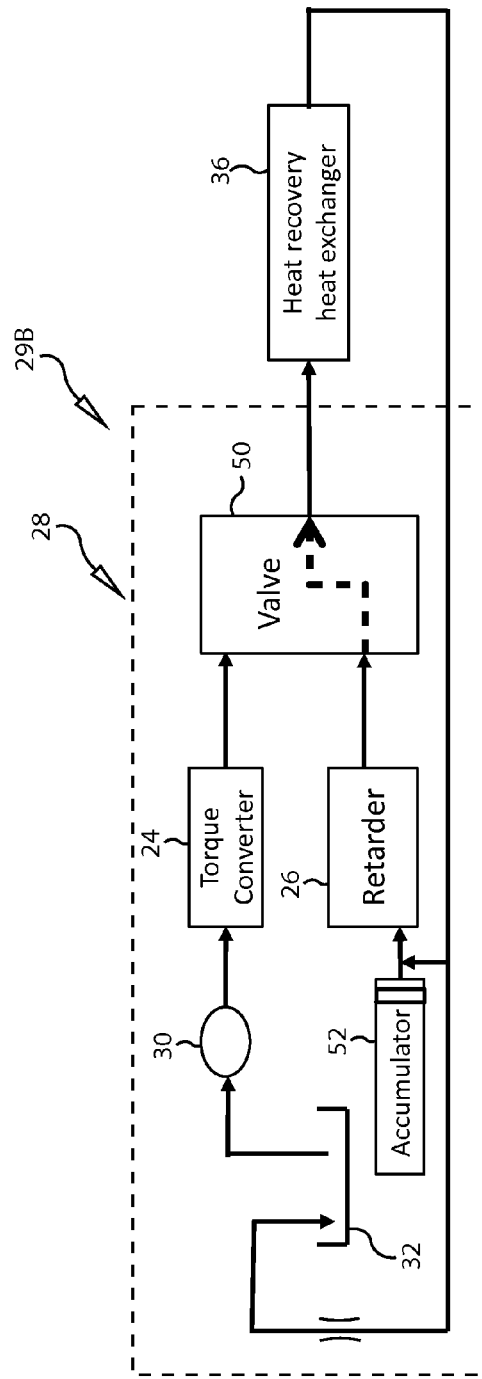
FIG. 2b is a schematic block diagram similar to that of FIG. 2a, with the valve shown in a second position.

Turning now to FIG. 2b, the working fluid circuit 28 is shown in the powertrain retarding mode 29b. That is, the working fluid circuit valve 50 is moved to a second position, such as in response to an electrical, mechanical, or hydraulic force, in which the hydraulic retarder 26 is fluidly connected with the heat recovery heat exchanger 36. Working fluid is circulated into the hydraulic retarder 26 from the accumulator 52, during powertrain retarding mode 29b, where the working fluid is used to absorb energy and assist in slowing, or braking, the load 18. The heated working fluid is expelled from the retarder and circulated through the heat recovery heat exchanger 36 through the working fluid circuit valve 50. The second position of the working fluid circuit valve 50 may correspond to the powertrain retarding mode 29b and, as such, the working fluid may be circulated from the hydraulic retarder 26 along the working fluid circuit 28, through the valve 50, and through the heat recovery heat exchanger 36 during the powertrain retarding mode 29b.

Figure 3:
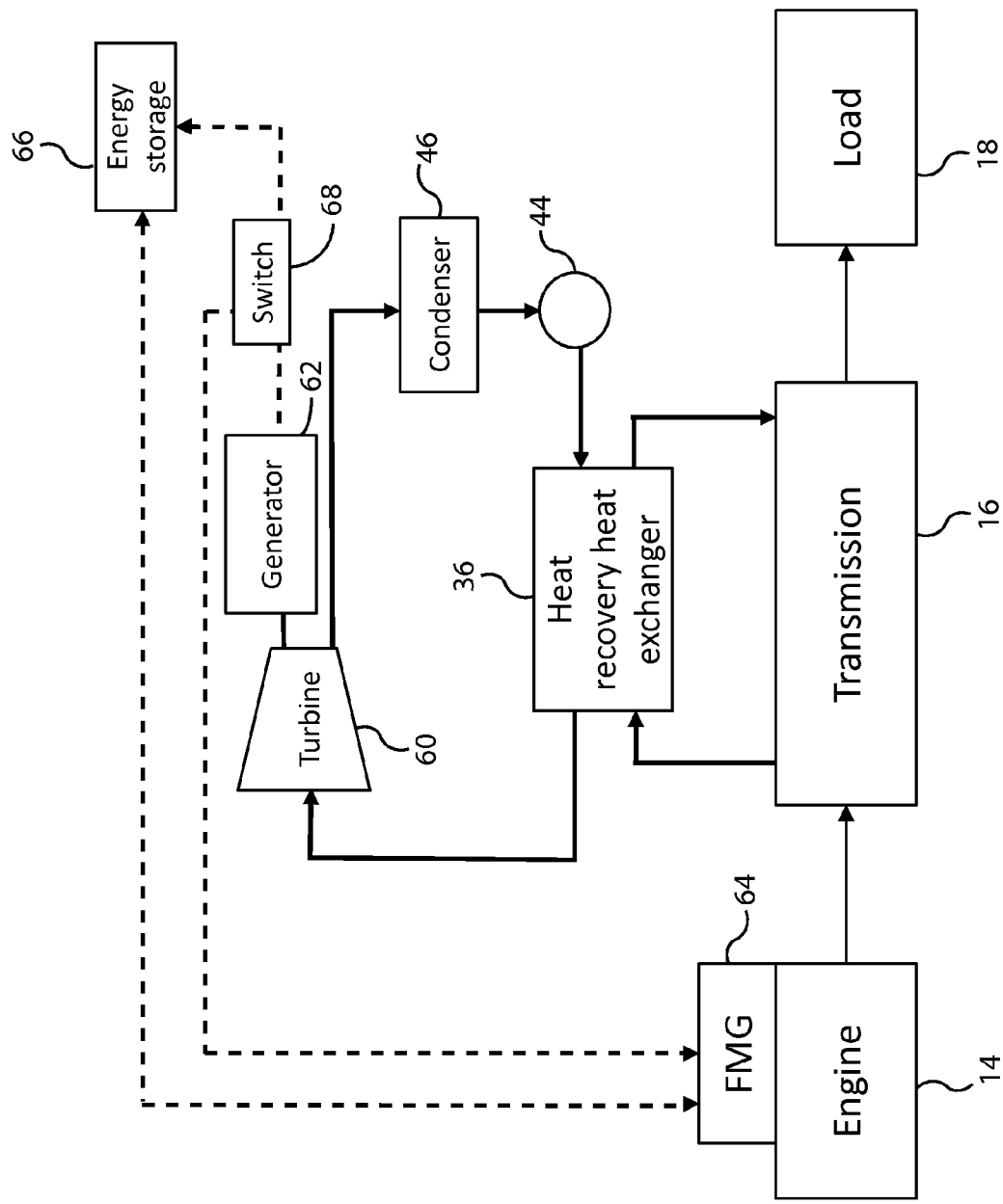
FIG. 3 is a schematic block diagram of portions of the powertrain waste heat recovery system of FIG. 1, including a first exemplary conversion device.

The thermal energy transferred from the working fluid to the heat recovery fluid may be converted to another energy form by the conversion device 42 (FIG. 1). For example, as shown in FIG. 3, the conversion device 42 may include a turbine, or steam engine, 60 driven by the heat recovery fluid. According to some embodiments, the turbine 60 may be geared, directly or indirectly, to the engine crankshaft. According to other embodiments, an electrical power generator 62 may be driven by the turbine 60. The electrical power generated by the electrical power generator 62 may be supplied to a flywheel motor-generator 64 associated with the engine 14 and/or transmission 16.

Additionally, or alternatively, electrical power generated by the electrical power generator 62 may be supplied to an onboard energy storage device 66. For example, a switch 68 may be incorporated to selectively direct or distribute electrical energy to the flywheel motor-generator 64 and/or the energy storage device 66. According to another example, electrical power generated by the electrical power generator 62 in powertrain propulsion mode 29a may be supplied to a motor portion of the flywheel motor-generator 64 in real-time, or near real-time, while electrical power generated by the electrical power generator 62 in powertrain retarding mode 29b may be supplied to a generator portion of the flywheel motor-generator 64 in near real-time.

Figure 4:
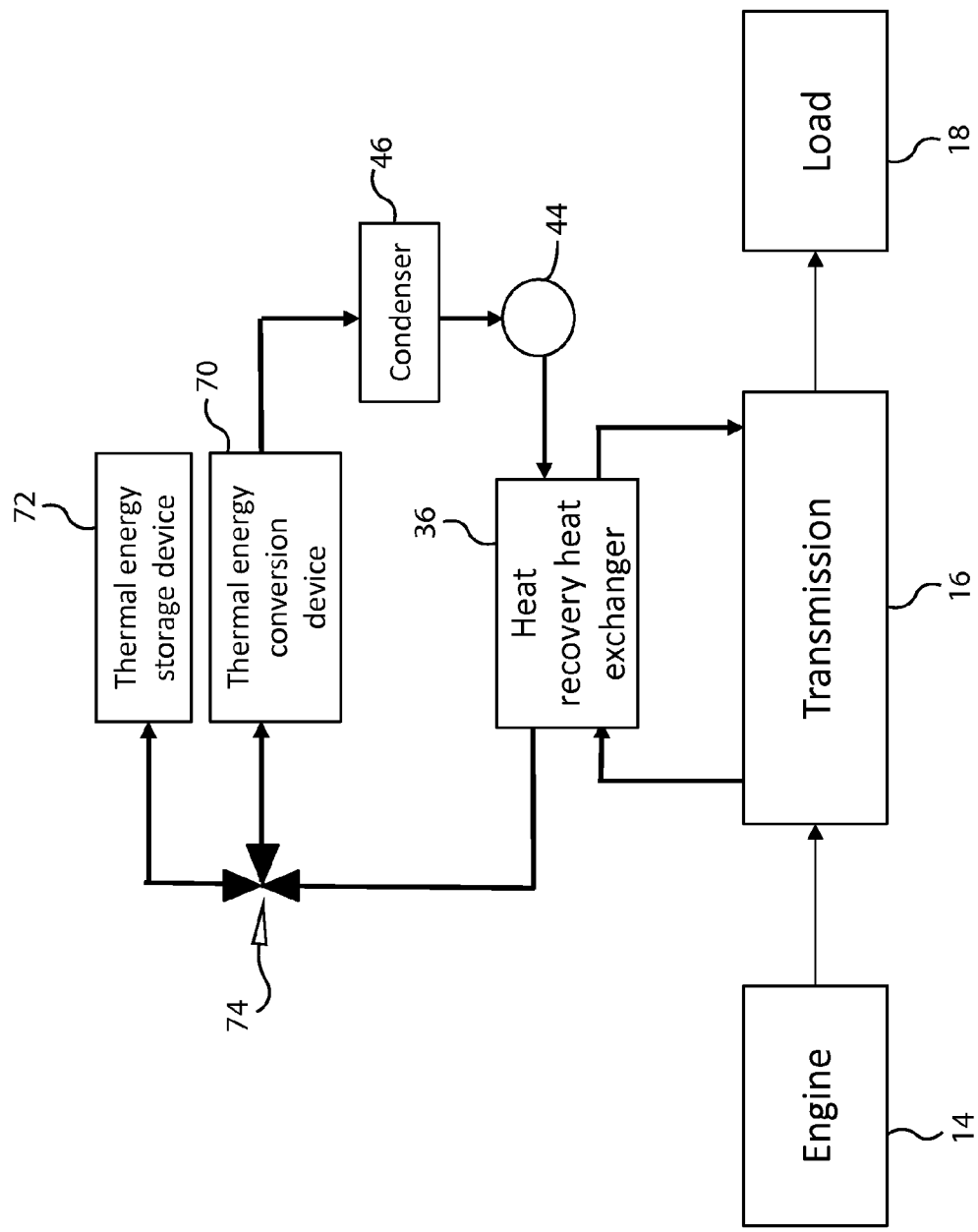
FIG. 4 is a schematic block diagram of portions of the powertrain waste heat recovery system of FIG. 1, including a second exemplary conversion device.

According to yet an alternative embodiment, illustrated in FIG. 4, a thermal energy conversion device 70 or a thermal energy storage device 72 may receive the thermal energy from the heat recovery fluid. According to some embodiments, a valve 74 may be used to selectively control whether thermal energy is routed to the thermal energy conversion device 70 or the thermal energy storage device 72.

INDUSTRIAL APPLICABILITY

The present disclosure may be applicable to vehicles or machines having powertrains. Further, the present disclosure may be applicable to vehicles or machines having drivetrains that generate energy in the form of heat that is wasted. Yet further, the present disclosure may be particularly applicable to drivetrains having one or more components producing waste heat during powertrain propulsion and one or more components producing waste heat during powertrain retarding.

Referring generally to FIGS. 1-4, a powertrain waste heat recovery system 10, according to the present disclosure, generally includes a first powertrain component 24, such as a torque converter, and a second powertrain component 26, such as a hydraulic retarder. More specifically, the torque converter 24 and hydraulic retarder 26 may be referred to as drivetrain components. The powertrain waste heat recovery system 10 also includes a working fluid circuit 28 circulating a working fluid through the torque converter 24, the hydraulic retarder 26, and a heat recovery heat exchanger 36. According to a specific embodiment, the working fluid is circulated from the torque converter 24 along the working fluid circuit 28 and through the heat recovery heat exchanger 36 during a powertrain propulsion mode 29a, and the working fluid is circulated from the hydraulic retarder 26 and through the heat recovery heat exchanger 36 during a powertrain retarding mode 29b.

Thus, the heat recovery heat exchanger 36 transfers heat from the torque converter 24 during the powertrain propulsion mode 29a, and transfers heat from the hydraulic retarder 26 during the powertrain retarding mode 29b. The thermal energy received in the heat recovery circuit 34 may be converted to another energy form, such as electrical energy, which may be used or stored. Alternatively, the thermal energy may be stored for later use or conversion.

The powertrain waste heat recovery system 10 disclosed herein offers a means for recovering waste heat from the drivetrain 20. Conventionally, waste heat generated by one or both of the torque converter 24 and the hydraulic retarder 26, components of the transmission system 16 that generate the most waste heat, is transferred into the environment. For example, the working fluid of the transmission system 16 is typically circulated through a heat exchanger, which receives the heat from the working fluid and ultimately transfers it to the environment. The powertrain waste heat recovery system 10 captures the waste heat for immediate use or storage, often in another form of energy.

The powertrain waste heat recovery system 10 of the present disclosure may be integrated with a system for recovering waste heat from the engine 14. For example, the heat recovery circuit 34 may be modified to include an additional heat exchanger for transferring waste heat from the engine 14 and/or engine exhaust to the working fluid. The heat recovery heat exchanger 36 may be positioned upstream from the heat exchanger capturing waste heat from the engine 14, if it is determined that the engine 14 will generate more waste heat than the transmission system 16.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A powertrain waste heat recovery system, comprising:
   a torque converter;
   a hydraulic retarder;
   a transmission operatively coupled between the torque converter and the hydraulic retarder;
   a heat recovery heat exchanger;

a heat recovery circuit fluidly connected to the heat recovery heat exchanger, wherein the heat recovery circuit is configured to circulate a heat recovery fluid through the heat recovery heat exchanger, a working fluid circuit fluidly connected to the torque converter, the hydraulic retarder, and the heat recovery heat exchanger, wherein the working fluid circuit is configured to circulate a working fluid through the torque converter, the hydraulic retarder, and the heat recovery heat exchanger, wherein the working fluid is fluidly isolated from the heat recovery fluid;

wherein the heat recovery heat exchanger is configured to transfer heat from the torque converter to the heat recovery fluid during a powertrain propulsion mode and transfer heat from the hydraulic retarder to the heat recovery fluid during a powertrain retarding mode; and a conversion device fluidly connected to the heat recovery circuit, wherein the conversion device is configured to convert thermal energy from the heat recovery fluid to an energy form other than thermal energy.

2. The powertrain waste heat recovery system of claim 1, wherein the working fluid is circulated from the torque converter along the working fluid circuit and through the heat recovery heat exchanger during the powertrain propulsion mode, and the working fluid is circulated from the hydraulic retarder along the working fluid circuit and through the heat recovery heat exchanger during the powertrain retarding mode.

3. The powertrain waste heat recovery system of claim 2, further including a working fluid circuit valve having a first position fluidly connecting the torque converter with the heat recovery heat exchanger and a second position fluidly connecting the hydraulic retarder with the heat recovery heat exchanger.

4. The powertrain waste heat recovery system of claim 1, further including a supplemental working fluid heat exchanger in fluid communication with the working fluid circuit.

5. The powertrain waste heat recovery system of claim 4, wherein the working fluid circuit includes a valve operable to selectively include or bypass the supplemental working fluid heat exchanger.

6. The powertrain waste heat recovery system of claim 1, wherein the conversion device includes a turbine or steam engine.

7. The powertrain waste heat recovery system of claim 6, wherein the conversion device further includes an electrical power generator.

8. The powertrain waste heat recovery system of claim 7, wherein electrical power generated by the electrical power generator is supplied to a flywheel motor-generator.

9. The powertrain waste heat recovery system of claim 7, wherein electrical power generated by the electrical power generator is supplied to an onboard energy storage device.

10. A method of recovering waste heat using a powertrain waste heat recovery system, the method comprising:

circulating a heat recovery fluid along a heat recovery circuit and through a heat recovery heat exchanger;

transferring heat, during said circulating, from a torque converter to the heat recovery fluid using the heat recovery heat exchanger during a powertrain propulsion mode;

transferring heat, during said circulating, from a retarder to the heat recovery fluid using the heat recovery heat exchanger during a powertrain retarding mode; and converting thermal energy, after said transferring the heat from the torque converter or said transferring the heat from the retarder, from the heat recovery fluid to an energy form other than thermal energy using a conversion device.

11. The method of claim 10, further including circulating a working fluid along a working fluid circuit and through the torque converter, the retarder, and the heat recovery heat exchanger, wherein the working fluid is fluidly isolated from the heat recovery fluid.

12. The method of claim 11, further including:

circulating the working fluid from the torque converter along the working fluid circuit and through the heat recovery heat exchanger during the powertrain propulsion mode; and circulating the working fluid from the retarder along the working fluid circuit and through the heat recovery heat exchanger during the powertrain retarding mode.

13. The method of claim 11, further comprising:

wherein the working fluid circuit includes a working circuit valve;

fluidly connecting the torque converter with the heat recovery heat exchanger by moving the working fluid circuit valve to a first position during the powertrain propulsion mode; and fluidly connecting the retarder with the heat recovery heat exchanger by moving the working fluid circuit valve to a second position during the powertrain retarding mode.

14. The method of claim 10, further including converting the thermal energy from the heat recovery fluid into electrical power using a turbine or steam engine and an electrical power generator.

15. The method of claim 14, further including supplying the electrical power to a flywheel motor-generator.

16. The method of claim 14, further including supplying the electrical power to an onboard energy storage device.

17. A powertrain waste heat recovery system, comprising:

a first powertrain component;

a second powertrain component;

a heat recovery circuit circulating a heat recovery fluid through a heat recovery heat exchanger, the heat recovery heat exchanger transferring heat from the first powertrain component to the heat recovery fluid during a powertrain propulsion mode and transferring heat from the second powertrain component to the heat recovery fluid during a powertrain retarding mode;

a conversion device for converting thermal energy from the heat recovery fluid to an energy form other than thermal energy;

wherein the conversion device includes a turbine or steam engine;

wherein the conversion device further includes an electrical power generator; and wherein electrical power generated by the electrical power generator is supplied to a flywheel motor-generator.

18. The powertrain waste heat recovery system of claim 17, further including a working fluid circuit circulating a working fluid, which is fluidly isolated from the heat recovery fluid, through the first powertrain component, the second powertrain component, and the heat recovery heat exchanger.

19. The powertrain waste heat recovery system of claim 17, wherein the first powertrain component is a torque converter.

20. The powertrain waste heat recovery system of claim 17, wherein the second powertrain component is a hydraulic retarder.

21. A method of recovering waste heat using a powertrain waste heat recovery system, the method comprising steps of:
circulating a heat recovery fluid along a heat recovery circuit and through a heat recovery heat exchanger;
transferring heat, during the circulating step, from a first powertrain component to the heat recovery fluid using the heat recovery heat exchanger during a powertrain propulsion mode;
transferring heat, during the circulating step, from a second powertrain component to the heat recovery fluid using the heat recovery heat exchanger during a powertrain retarding mode;
converting thermal energy, after the first transferring step or the second transferring step, from the heat recovery fluid to an energy form other than thermal energy using a conversion device;
converting the thermal energy from the heat recovery fluid into electrical power using a turbine or steam engine and an electrical power generator; and
supplying the electrical power to a flywheel motor-generator.

22. The method of claim 21, further including circulating a working fluid along a working fluid circuit and through the first powertrain component, the second powertrain component, and the heat recovery heat exchanger, wherein the working fluid is fluidly isolated from the heat recovery fluid.

23. The method of claim 22, further including:
circulating the working fluid from the first powertrain component along the working fluid circuit and through the heat recovery heat exchanger during the powertrain propulsion mode; and
circulating the working fluid from the second powertrain component along the working fluid circuit and through the heat recovery heat exchanger during the powertrain retarding mode.

* * * * *